(12) United States Patent
Chau

(10) Patent No.: US 6,797,156 B2
(45) Date of Patent: Sep. 28, 2004

(54) FAUCET WATER TREATMENT

(76) Inventor: Yiu Chau Chau, 80 West Beaver Creek Road, Unit 14, Richmond Hills, Ontario (CA), L4B 1H3

( * ) Notice: Subject to any disclaimer, the term of this patent is extended or adjusted under 35 U.S.C. 154(b) by 349 days.

(21) Appl. No.: 10/026,233

(22) Filed: Dec. 21, 2001

(65) Prior Publication Data
US 2003/0116495 A1 Jun. 26, 2003

(51) Int. Cl.$^7$ .......................... B01D 24/12; B01D 24/38
(52) U.S. Cl. ...................... 210/94; 210/138; 210/433.1; 210/422; 210/424; 210/449; 210/234; 137/614.2; 137/614.21; 137/801; 137/549; 251/149.6; 239/575
(58) Field of Search .................. 210/94, 138, 433.1, 210/422, 424, 449, 234; 137/614.2, 614.21, 549, 801; 251/149.6; 239/575

(56) References Cited

U.S. PATENT DOCUMENTS

| 163,814 A | 5/1875 | Sinclaire |
| 171,056 A | 12/1875 | Sinclaire |
| 197,368 A | 11/1877 | Hobson |

(List continued on next page.)

FOREIGN PATENT DOCUMENTS

| EP | 0 487 327 A2 | 5/1992 |
| EP | 0 598 590 A1 | 5/1994 |
| EP | 0 720 862 | 1/1996 |
| GB | 2 174 920 | 11/1986 |
| JP | 6-137442 A | 5/1994 |
| WO | WO 99 37375 A1 | 7/1999 |

OTHER PUBLICATIONS

"The 5600 Water Conditioning Control", undated.
"Owners Manual How to Maintain and Operate your Eco-Water Electronic Demand Water System", EcoWater Systems, St. Paul, MN, 8/95, 32 pages.
"Controls for Water Treatment", Fleck Controls, Inc., Brookfield, WI, 9/96, 8 pages.
PCT International Search Report for application No. PCT/IB 02/05762 mailed May 15, 2003.

Primary Examiner—Blaine Copenheaver
Assistant Examiner—Minh-Chau T. Pham
(74) Attorney, Agent, or Firm—Cook, Alex, McFarron, Manzo, Cummings & Mehler, Ltd.

(57) ABSTRACT

A water treatment unit is disclosed which can be mounted directly on the faucet or tap of the user's sink and which contains one or more water treatment media and an operating valve which permits the selection of several operating modes including service, spray and stream modes. In the service mode the water is treated by at least one if not all of the various water treatment media contained in the unit housing after which the water is discharged from the valve of the unit for service use, and the service discharge may be adjusted to direct the treated water as desired by the user. The valve of the treatment unit includes a housing, a stationary member, a slide member and a rotatable switch member unit and may also be operated in a backflush mode in which water may be directed in the reverse direction through at least one of the water treatment media to regenerate that media. The volume of flow through the unit may also be sensed to measure the life of the treatment media to signal when they should be replaced.

46 Claims, 9 Drawing Sheets

U.S. PATENT DOCUMENTS

| | | | |
|---|---|---|---|
| 2,101,961 A | | 12/1937 | Slidell |
| 3,523,762 A | | 8/1970 | Broughton |
| 4,115,275 A | | 9/1978 | Kelly |
| 4,196,081 A | | 4/1980 | Pavia |
| 4,412,923 A | | 11/1983 | Capitani et al. |
| 4,642,192 A | | 2/1987 | Heskett |
| 4,686,037 A | | 8/1987 | Lang |
| 5,041,219 A | | 8/1991 | Strand et al. |
| 5,097,863 A | * | 3/1992 | McCann et al. ............ 137/504 |
| 5,133,385 A | | 7/1992 | Kawakami |
| 5,135,654 A | | 8/1992 | Heskett |
| 5,149,437 A | | 9/1992 | Wilkinson et al. |
| 5,164,082 A | | 11/1992 | Lin |
| 5,171,442 A | | 12/1992 | Nakshbendi |
| 5,205,932 A | | 4/1993 | Solomon et al. |
| 5,242,589 A | | 9/1993 | Kuo et al. |
| 5,340,478 A | | 8/1994 | Strand et al. |
| 5,415,770 A | | 5/1995 | Heskett |
| 5,628,900 A | | 5/1997 | Naito |
| 5,634,888 A | * | 6/1997 | Henkin et al. ............... 601/148 |
| 5,823,229 A | * | 10/1998 | Bertrand et al. ......... 137/614.2 |
| 5,858,219 A | | 1/1999 | Kusmierz et al. |
| 5,989,425 A | * | 11/1999 | Yonezawa et al. .......... 210/282 |
| 6,042,729 A | | 3/2000 | Chau |
| 6,123,837 A | * | 9/2000 | Wadsworth et al. .......... 210/87 |
| 6,179,130 B1 | * | 1/2001 | Nguyen et al. ............. 210/424 |
| 6,254,772 B1 | | 7/2001 | Chau |
| 6,258,266 B1 | * | 7/2001 | Riback et al. ............... 210/234 |
| 6,474,155 B1 | * | 11/2002 | Berkcan et al. .......... 73/204.23 |

* cited by examiner

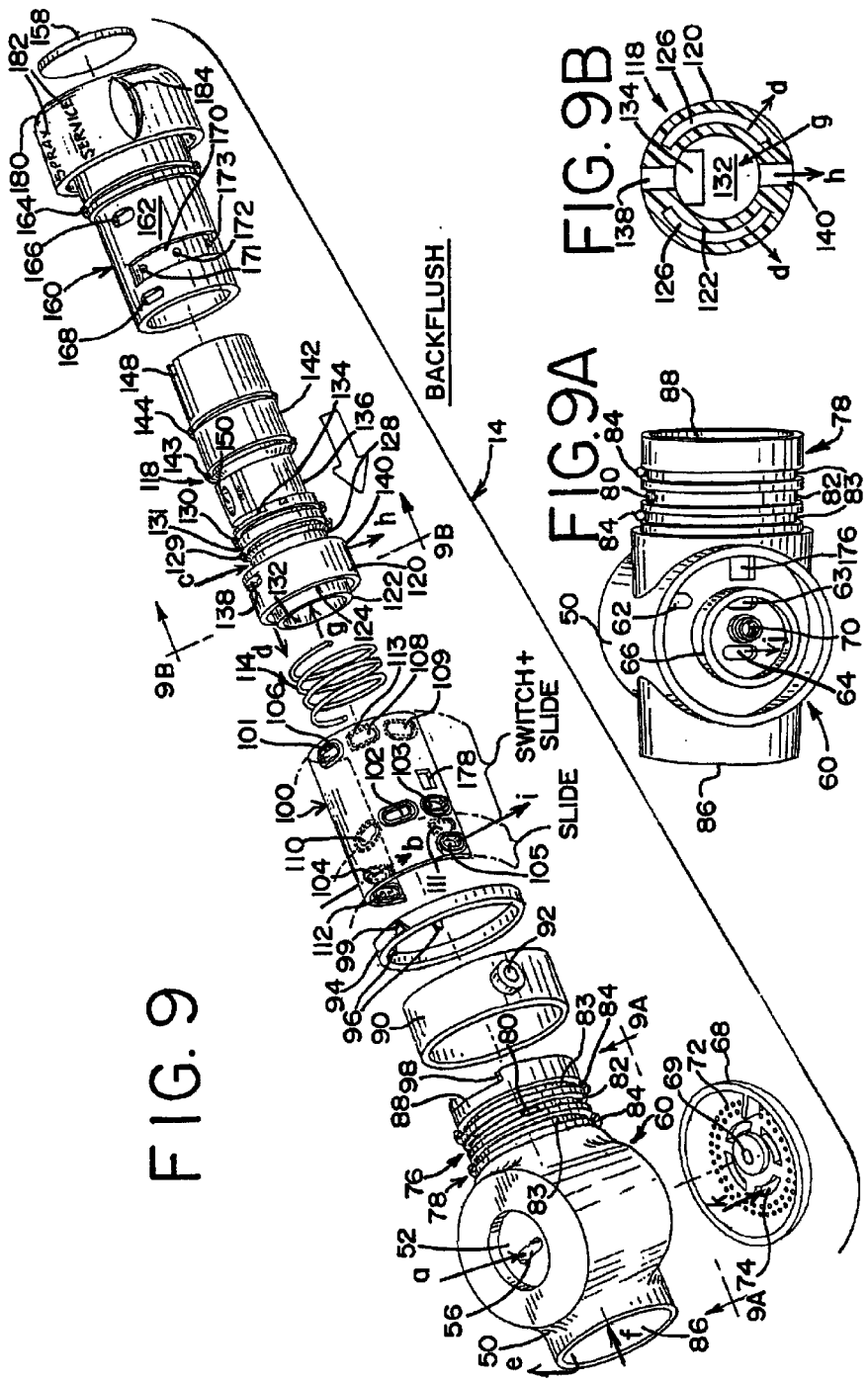

FAUCET WATER TREATMENT

BACKGROUND AND SUMMARY OF INVENTION

The present invention is directed to a water treatment unit, and more particularly, to a water treatment unit preferably for mounting on a water faucet or tap including a housing for containing water treatment media and a control valve for controlling the unit in several modes of operation.

Water treatment systems have been employed in the past for the treatment of water to remove various impurities and contaminants therefrom. For example, in my U.S. Pat. No. 6,042,729 a water treatment unit is disclosed which comprises a housing having a finely divided metal, such as alloys of copper and zinc, as one water treatment medium which is bactericidal and removes contaminants such as chlorine, and a second medium, such as activated carbon, for the removal of odors and the like. A valve is also disclosed in my patent which upon rotation of the housing containing the treatment media may be operable to anyone of several positions including service and backwash positions.

In my U.S. Pat. No. 6,254,772 a backwashable filtration system is also disclosed which includes a multimedia fluid treatment housing and a valve which is rotatable about an elongate axis between several positions including service and backwash positions.

It would be advantageous to provide a water treatment unit containing one or more water treatment media in which the media might be contained in a housing and an operating valve which is associated with the housing and media in order to permit the selection of several operating modes, and yet the unit would be sufficiently compact and organized to permit it to be mounted directly on the faucet or tap of the user's sink. The present invention meets that criteria.

In addition to meeting the aforementioned criteria, the present invention is capable of operation between a service, spray and stream mode. In the service mode the water is treated by at least one if not all of the various water treatment media contained in the unit housing after which the water is discharged from the valve of the unit for service use. Moreover, the service discharge is preferably adjustable to direct the treated water as desired by the user, for example, upwardly to permit drinking the water as one would drink the water from a water fountain, or downwardly into a container or the like beneath the faucet. The stream and spray modes are useful, for example, for the rinsing of dishes or the washing of fruits and vegetables and, in these latter modes, the water will pass through at least one of the water treatment media in the housing.

Also in the present invention, the valve of the treatment unit may be operated in a backflush mode in which water may be directed in the reverse direction through at least one of the water treatment media to regenerate that media. The volume of flow through the unit may also be sensed to measure the life of the treatment media to signal when it should be replaced.

In one principal aspect of the present invention, a valve comprises a valve housing having an elongate chamber therein, an inlet for fluid on the valve housing communicating with the chamber, and first and second discharges on the valve housing communicating with the chamber, and the first discharge includes first and second openings for discharging the fluid from the valve housing. A stationary member in the chamber has a plurality of openings therethrough at least some of which align with the inlet for fluid and the first and second openings of the first discharge and the second discharge, and the stationary member generally conforms in shape and size to the shape and size of the chamber. A switch member is located in the stationary member which is rotatable between spray, stream and service positions respectively to direct the fluid to the first opening so that it is discharged from the first discharge in the form of a spray when in the spray position, to direct the fluid to the second opening so that it is discharged from the first discharge as a stream when in the stream position, and to direct the fluid to the second discharge on the valve housing to discharge the fluid as service fluid from the valve housing when in the service position.

In another principal aspect of the present invention, the stationary member comprises a gasket.

In still another principal aspect of the present invention, the stationary member includes at least one seal thereon which blocks communication between the inlet and selected ones of the first and second openings and/or discharges when the switch member is rotated between the positions.

In still another principal aspect of the present invention, the chamber, the stationary member and the switch member are generally cylindrical in cross-section.

In still another principal aspect of the present invention, the first discharge on the valve housing includes a cap overlying the first and second openings, the cap comprises a plurality of small openings and at least one large opening spaced from the small openings, and wherein the first opening of the first discharge is aligned with the plurality of small openings to discharge the fluid from the plurality of small openings of the cap as a spray when the switch member is in the spray position, and the second opening of the first discharge is aligned with the large opening of the cap to discharge the fluid from the large opening as a stream when the switch member is in the stream position.

In still another principal aspect of the present invention, the valve housing includes a substantially cylindrical portion, and the second discharge on the valve housing is on the substantially cylindrical portion and includes a passage which extends for a substantial distance around the substantially cylindrical portion.

In still another principal aspect of the present invention, a control ring is located at the substantially cylindrical portion which covers the passage, the control ring includes a port therethrough for discharging the service fluid, and the control ring and port are rotatable about the substantially cylindrical portion to selectively direct the discharge of the service fluid.

In still another principal aspect of the present invention, an adapter mounts the inlet for fluid on the valve housing to the discharge of a faucet.

In still another principal aspect of the present invention, a slide member is located in the chamber which is movable longitudinally between a first position in which the switch member is functional in the spray, stream and service positions, and a second position in which the switch member is not functional in the last three mentioned positions.

In still another principal aspect of the present invention, the second position of the slide member is a backflush position in which the fluid is directed from the inlet for fluid on the valve housing to the second opening of the first discharge.

In still another principal aspect of the present invention, the slide member is in the stationary member and the switch member.

In still another principal aspect of the present invention, a water treatment unit comprises a treatment housing containing a water treatment medium therein, and the aforementioned valve.

In still another principal aspect of the present invention, an adapter mounts the inlet for fluid on the valve to the discharge of a faucet.

In still another principal aspect of the present invention, the a slide member is located in the chamber of the valve and is movable longitudinally between a first position in which the switch member is functional in the spray, stream and service positions, and a second position in which the fluid passes in the reverse direction through the treatment housing and water treatment medium to backflush the medium.

In still another principal aspect of the present invention, when the slide member is in the second position, the fluid is directed from the inlet for fluid on the valve through the treatment housing and in the reverse direction through the water treatment medium to the second opening of the first discharge and is discharged therefrom as a stream.

In still another principal aspect of the present invention, the treatment housing contains at least two distinct water treatment media, and the fluid passes through at least one of the media when the switch member is in either of the spray, stream or service positions or the slide member is in either of its first or second positions.

In still another principal aspect of the present invention, the fluid passes through both water treatment media when the switch member is in the service position.

In still another principal aspect of the present invention, the water treatment media is a finely divided metal particulate and/or charcoal.

In still another principal aspect of the present invention, the treatment housing includes a projection thereon which extends into the chamber of the valve, and wherein the projection includes at least one passage therethrough and/or together with the chamber defines at least one passage therearound through which the fluid flows to and/or from the water treatment medium in the treatment housing.

In still another principal aspect of the present invention, the projection has an end opposite the treatment housing, and the end is located in the stationary member and the switch member.

In still another principal aspect of the present invention, the unit includes at least one sensor for sensing the amount of fluid flow through the unit.

In still another principal aspect of the present invention, the sensor is located in the valve housing.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 5A is a bottom plan view of the valve housing as viewed substantially along line 5A—5A in FIG. 5;

FIG. 5B is a cross-sectioned, end elevation view of the slide member of the valve of the present invention as viewed substantially along line 5B—5B of FIG. 5;

FIG. 7A is a bottom plan view of the valve housing as viewed substantially along line 7A—7A in FIG. 7;

FIG. 7B is a cross-sectioned, end elevation view of the slide member of the valve of the present invention as viewed substantially along line 7B—7B of FIG. 7;

FIG. 9 is an exploded, perspective view of the valve of the unit shown in FIG. 8 in the backflush mode;

FIG. 9A is a bottom plan view of the valve housing as viewed substantially along line 9A—9A in FIG. 9; and FIG. 9B is a cross-sectioned, end elevation view of the slide member of the valve of the present invention as viewed substantially along 9B—9B of FIG. 9.

DESCRIPTION OF THE PREFERRED EMBODIMENT

Figure 1:
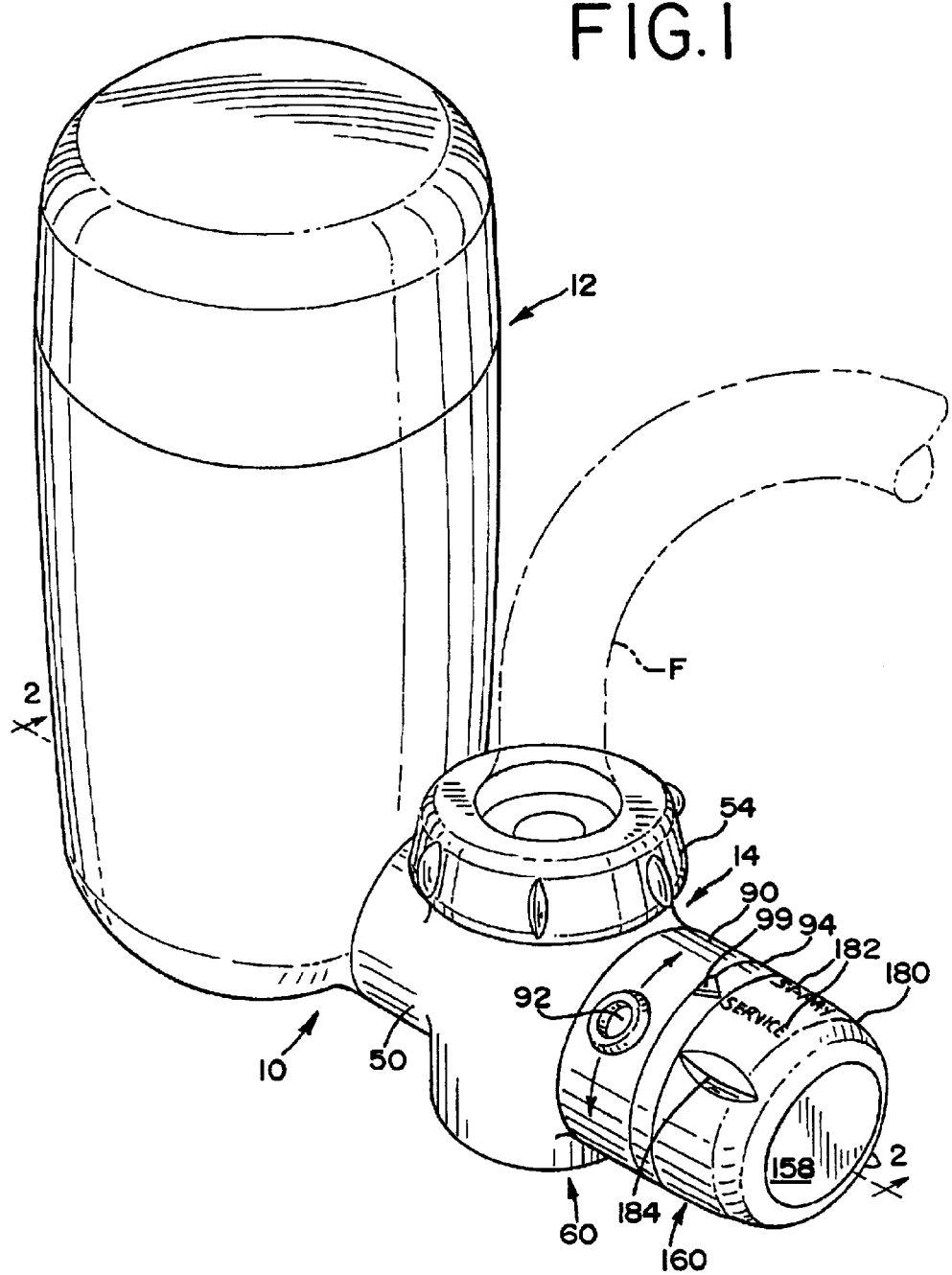
FIG. 1 is an overall perspective view of a preferred embodiment of water treatment unit in accordance with the principles of the present invention and as shown mounted to a faucet or tap in dot and dash.

A preferred embodiment of fluid treatment unit, such as a water treatment unit 10, is shown in the drawings. The preferred water treatment unit 10 generally comprises a treatment assembly 12 and a valve assembly 14, both of which are adapted to be coupled together by suitable means to form the overall water treatment unit 10.

The treatment assembly 12 comprises an outer housing 16 which is preferably molded and includes a generally cylindrical elongate projection 18 which extends from one side of the bottom of the housing 16 and into the valve assembly 14 as best seen in FIGS. 2, 4, 6 and 8. The projection 18 defines passages for communicating the fluid to be treated between the treatment assembly 12 and the valve assembly 14 as will be described later. The projection 18 is preferably integrally molded with the housing 16 to form a one piece assembly.

Figure 2:
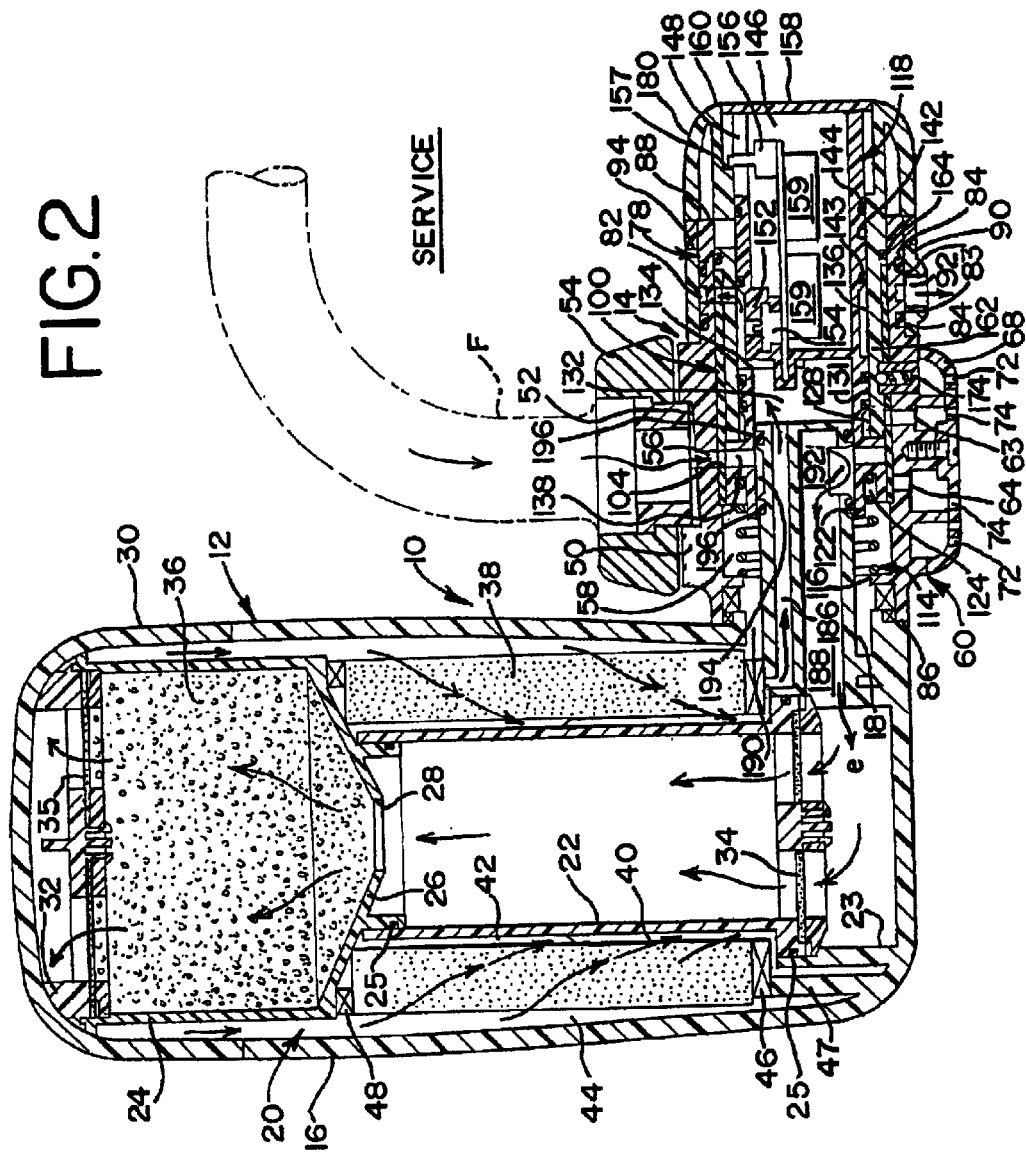
FIG. 2 is a cross-sectioned, side elevation view of the unit is viewed substantially along line 2—2 of FIG. 1 in the service mode.
Figure 4:
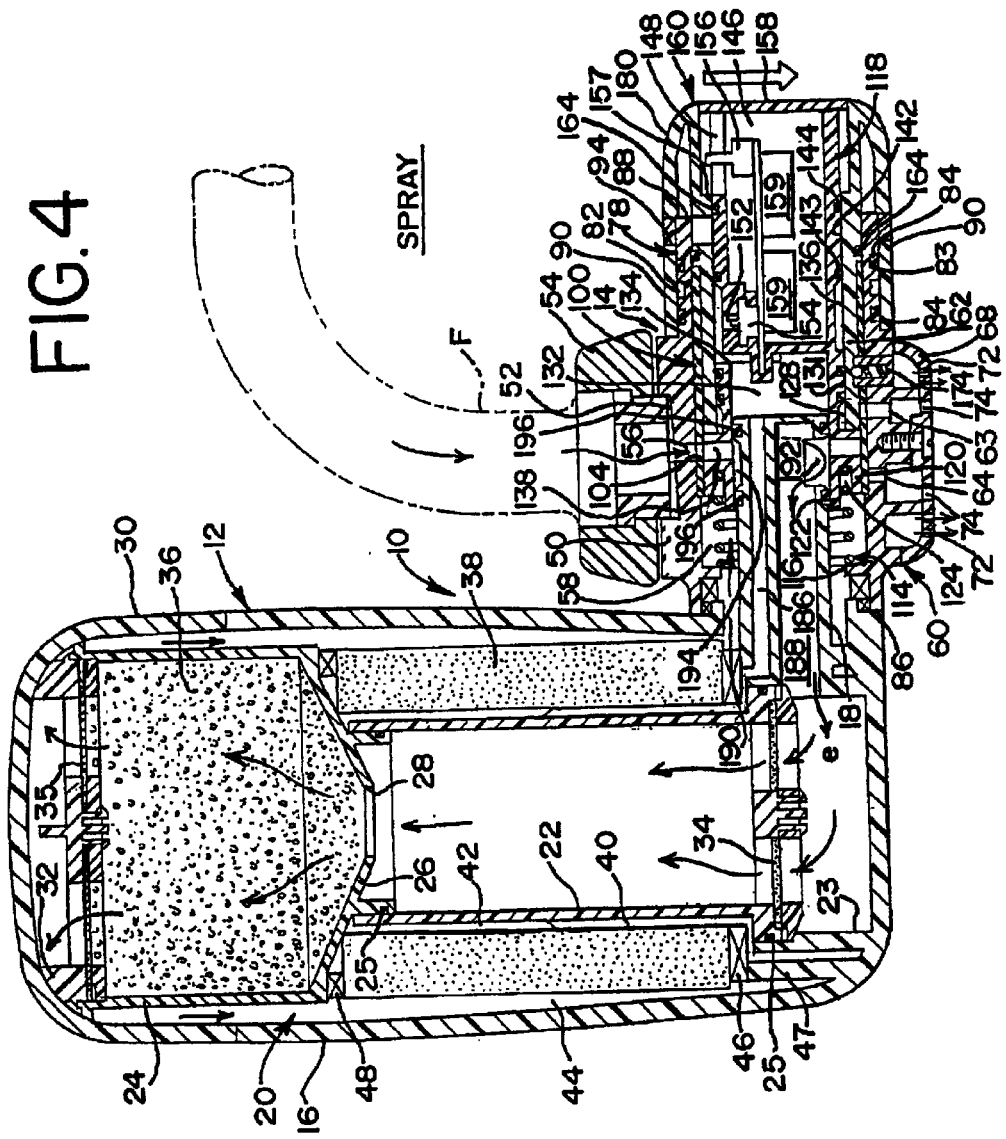
FIG. 4 is a cross-sectioned, side elevation view of the unit similar to that shown in FIG. 2, but with the unit in the spray mode.
Figure 6:
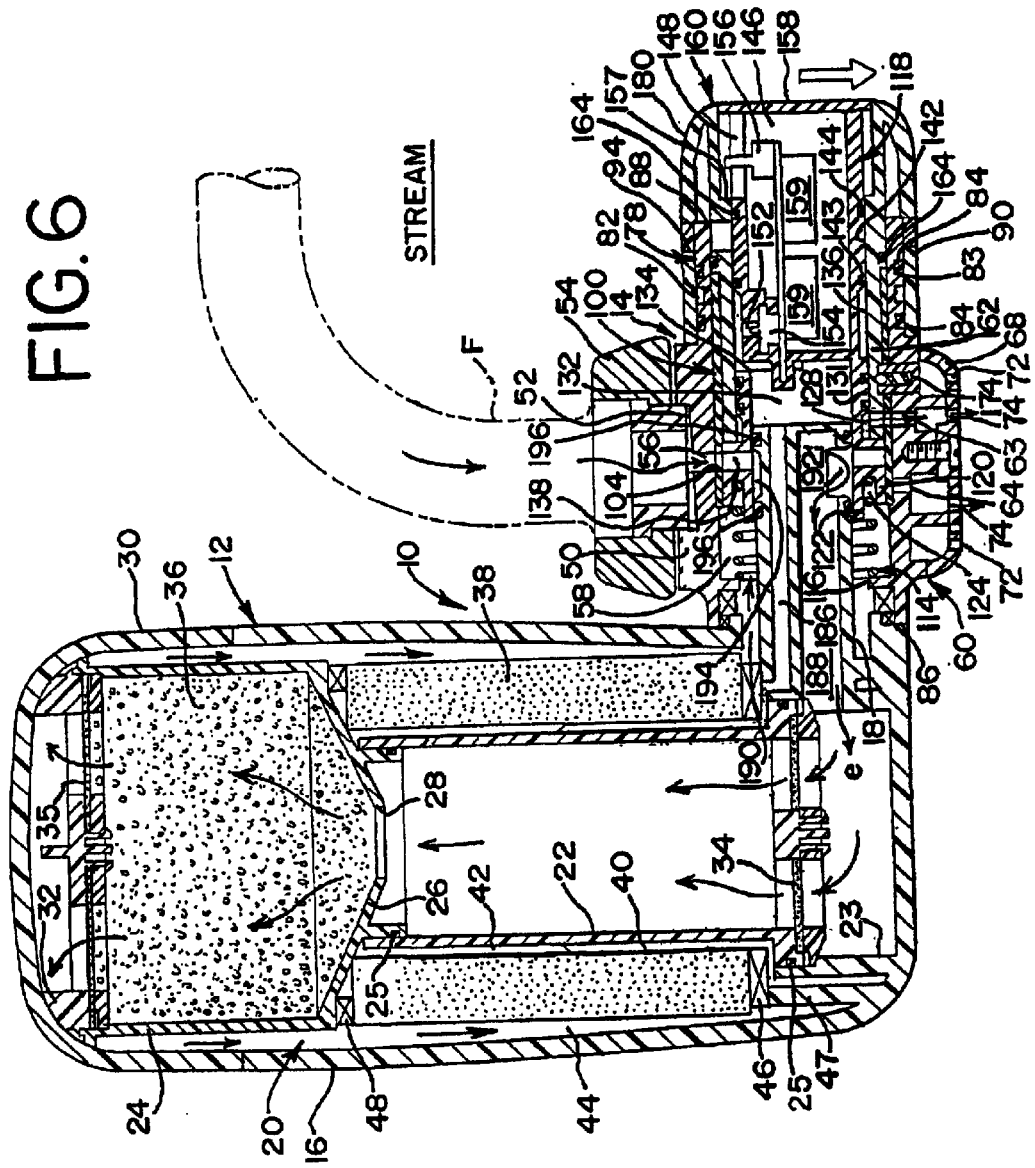
FIG. 6 is a cross-sectioned, side elevation view similar to that shown in FIGS. 2 and 4, but with the unit in the stream mode.
Figure 8:
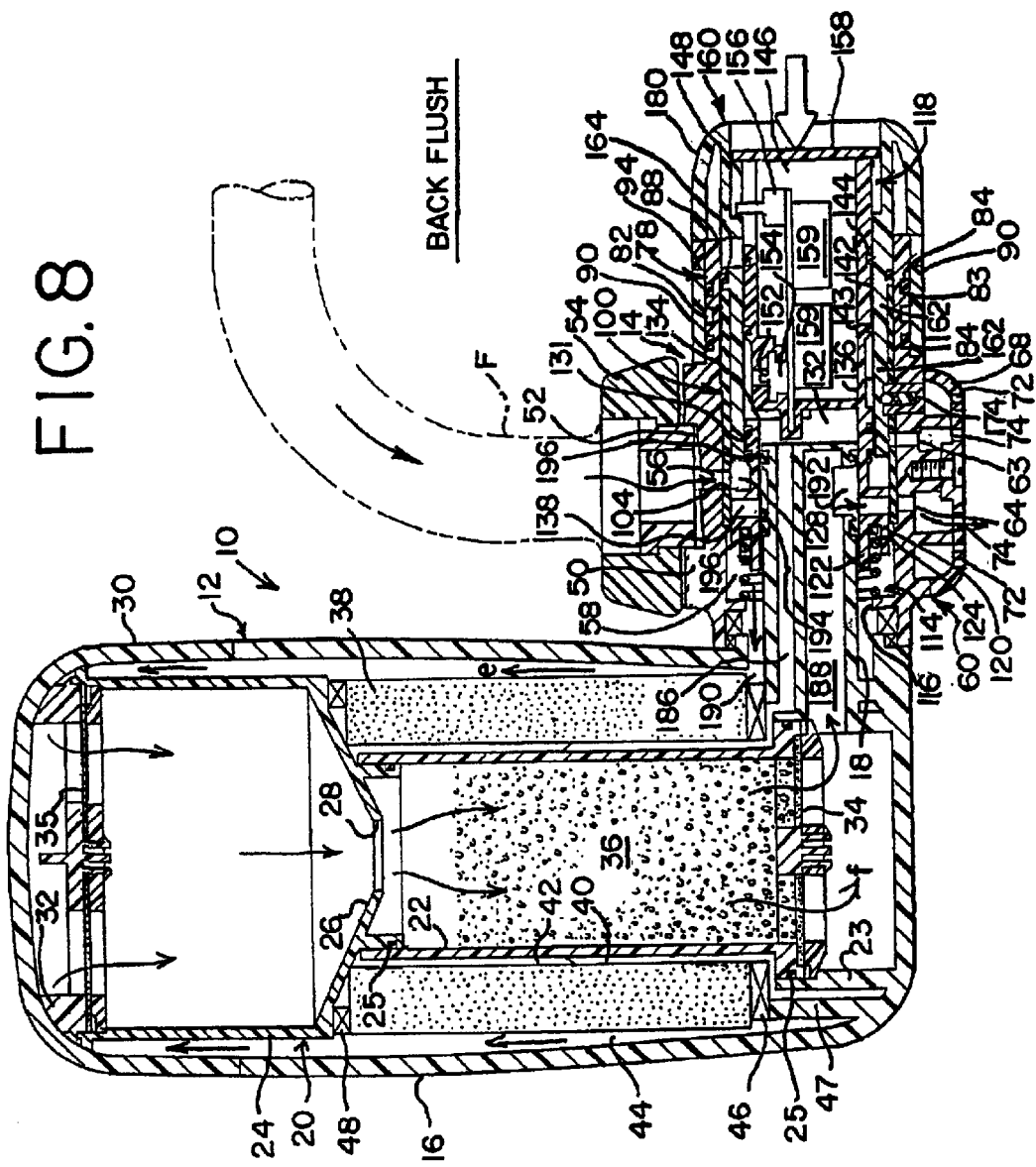
FIG. 8 is a cross-sectioned, side elevation view similar that shown in FIGS. 2, 4 and 6, but with the unit in the backflush mode.

The inner end of the projection 18 and the bottom of the housing 16 are also formed to support a treatment chamber 20 as best seen in FIGS. 2, 4, 6 and 8. The treatment chamber 20 generally comprises a lower smaller diameter cylindrical section 22 which is supported upon a flange 23 and the inner end of the projection 18, and a larger diameter cylindrical upper section 24 which is supported on the upper end of the lower section 22 in the upper part of the housing 16. O-rings 25 seal the lower end of the cylindrical section 22 to the flange 23 and the upper end of the lower cylindrical section 22 to a flange on the bottom of the upper cylindrical section 24. The upper section 24 of the treatment chamber has a bottom wall 26 which slopes downwardly as seen in FIGS. 2, 4, 6 and 8, and has an opening 28 in its lower apex. The upper end of the housing 16 is preferably formed as a cap 30 which may be selectively removed from the remainder of the housing to expose the water treatment assembly on the inside of the housing for service and replenishment. The cap 30 also preferably includes spaced vanes 32 which extend downwardly into the housing to hold the upper section 24 of the treatment chamber 20 down during operation and permit the water which has been at least partially treated in the treatment chamber to pass through a fine mesh filter 35 and between the vanes and down the outside of the upper section 24 as seen in FIGS. 2, 4 and 6 or upwardly during backwash as seen in FIG. 8.

The treatment chamber 20 also includes a fine mesh filter 34 at the bottom of the lower section 22. The fine mesh filter 34 restrains extremely small particles of solid contaminates prior to initial treatment by the various filter media, and also provides a base upon which a particulate water treatment media 36 in the water treatment chamber 20 can rest when the system is shut off or when the system is being backflushed as seen in FIG. 8. The particulate medium 36 is preferably a finely divided metal, such as alloys of copper and zinc, as disclosed for example in my U.S. Pat. No. 6,042,729. This medium has the advantage that it removes chlorine as well as being a bacteriacide, and may be initially washed and suspended as discussed in my aforementioned U.S. Pat. No. 6,042,729 and as shown in FIGS. 2, 4 and 6 herein upon the commencement of water flow.

A second treatment medium preferably comprises a cylinder block of activated carbon which is also positioned in the treatment assembly 12. This cylindrical activated carbon block 38 is slipped over the somewhat smaller diameter lower section 22 of the treatment chamber 20, and is supported in spaced relationship from the walls of lower section 22 by a plurality of vertically extending ribs 40 on the lower section 22. The ribs 40 thereby define vertical channels 42 through which the water may flow after passage through the carbon block filter 38 and as shown in FIG. 2. The outer diameter of the carbon block filter 38 is also smaller than the inner diameter of the housing 16 to define a channel 44 through which the water may flow during the several procedures. The carbon block filter 38 is preferably supported upon a gasket 46 which rests upon a suitable flange 47 at the bottom of the housing and, in turn, the upper end of the carbon block filter 38 supports the outer perimeter of the upper section 24 of the treatment chamber 20 on a gasket 48.

The valve assembly 14 comprises a valve housing 50 having a recess 52 in the top thereof which contains an adapter 54 for mounting the valve assembly 14 on a discharge of a faucet or tap F as best seen in FIGS. 2, 4, 6 and 8. The recess 52 includes an inlet opening 56 on the valve housing which communicates with a chamber 58 in the valve housing. The chamber 58 is generally cylindrical in cross-section and extends from one end of the valve housing 50 to the other.

A bottom directed discharge 60 is also provided on the valve housing 50. The bottom directed discharge 60 includes several openings which communicate with the chamber 58 to discharge fluid from the housing and chamber. As best seen in FIGS. 5A, 7A and 9A, one opening 62 preferably is at the outer edge of the bottom directed discharge 60. Two more openings 63 and 64 are positioned toward the interior and toward the center of the bottom directed discharge, 60 and within a generally circular partition wall 66, also as best seen in FIGS. 5A, 7A and 9A.

The bottom directed discharge 60 also preferably includes a cap 68 which covers the bottom directed discharge and is fixed to the valve housing 50 by suitable means, such as a screw (not shown) which extends through a hole 69 in the cap and is received in a female socket 70 on the housing. The cap 68 also includes a pattern of a plurality of small holes 72 and a pattern of a plurality of slots 74 arranged in a generally circular pattern within the small hole pattern 72. The partition wall 66 is sized and shaped to be positioned between the small hole pattern 72 and the slot pattern 74 when the cap 68 is assembled to the valve housing 50 bottom directed discharge 60. Thus, the partition wall 66 prevents the discharge from opening 62 from passing through the slot pattern 74, and directs it to the small hole spray pattern 72. Conversely, the partition wall 66 prevents the discharges from either opening 63 or 64 from passing through the small hole spray pattern 72, and restricts the discharges from openings 63 or 64 to passage through the slot pattern 74.

A second fluid discharge generally 76, as best seen in FIGS. 3, 5, 7 and 9, is located on a generally cylindrical extension portion 78 of the valve housing 50. The second fluid discharge 76 also communicates with the chamber 58 in the valve housing 50 and includes an opening 80 which preferably communicates with a generally annular passage 82 about the circumference of the cylindrical portion 78. Annular grooves 83 also straddle the annular passage 82 and the grooves 83 contain O-rings 84 for sealing the annular passage 82 against leakage laterally along the length of the cylindrical portion 78.

The chamber 58 is open at each of its ends 86 and 88 to receive the treatment housing projection 18 into the chamber 58 from the left through end 86 as best seen in FIGS. 2, 4, 6 and 8, and to receive other components of the valve into the chamber 58 from the right through end 88 as will be described in further detail to follow.

Two components of the preferred embodiment of the valve assembly 14 of the present invention are positioned over the cylindrical portion 78.

One such component is a service control ring 90 which has a port 92 therein. The service control ring 90 is positioned in overlying relationship to the annular passage 82 and O-rings 84, and may preferably be rotated 360° about the cylindrical portion 78. When the valve is in the service position, water floods the annular passage 82 from the opening 80, and is directionally selectively discharged through the port 92 because of the rotatability of the central ring 90. This permits selective directional discharge of the service fluid, for example in an upward direction to be consumed as in a water fountain or directly downwardly to fill a glass or other container.

The other component which fits over the end of the cylindrical portion 78 after the service control ring 90 has been installed is a position indicator ring 94. The position indicator ring 94 has a pair of fixed lugs 96 which are positioned to fit into a slot 98 on the end of the cylindrical portion 78 to keep the indicator ring from rotating. The fixed position indicator ring 94 also contains a suitable reference pointer 99 thereon for indicating which position the valve has been switched to as will be described in further detail to follow.

A generally cylindrical stationary member 100 is located in the chamber 58. The stationary member is preferably formed of a relatively resilient material and takes the form of a gasket. The gasket 100 generally conforms to the size and shape of the wall of the chamber 58, and is preferably generally arcuate, as best seen in FIGS. 3, 5, 7 and 9. This arcuate somewhat flexible form and quality facilitates the insertion and positioning of the gasket 100 in the chamber 58.

The gasket 100 has a plurality of ports 101, 102, 103, 104 and 105 extending through the thickness of the gasket. Each of the ports is surrounded by a suitable raised seal 106, for example as shown on port 101. The gasket 100 also includes a plurality of blind seals 108, 109, 110, 111 and 112 which do not open through the thickness of the gasket 100. Each of the blind seals is also surrounded by a raised seal 113, as shown for example on blind seal 108.

When the gasket 100 has been properly positioned in the chamber 58 of the valve housing 50, port 104 will be positioned in alignment with the inlet opening 56 on the valve housing to permit passage of the fluid through the inlet 56 and the port 104 in the stationary gasket 100, and on to the appropriate port in another component of the valve of the present invention as will be described to follow. The other ports 101, 102, 103 and 105 will also be aligned either with other ports, water zones or blocking zones on other components of the valve which will also be described to follow. Finally, the blind seals 108, 109, 110, 111 and 112 may or may not be aligned with given ports on other components of the valve at any given time as will be as described to follow. When a blind seal is aligned with a port on another component, it will block flow through that port.

Following the insertion and positioning of the stationary gasket 100 in the chamber 58 of the valve housing 50, a spring 114 is next installed in the chamber 58 until the left end of the spring as viewed in the drawings comes to bear against a shoulder 116 on the valve housing 50 toward the far left end of the chamber 58, as best seen in FIGS. 2, 4, 6 and 8.

A slide member 118 is next inserted into the chamber 58 and the stationary gasket 100 until the slide member contacts the spring 114. The slide member 118 includes an annular collar 120 which extends about the left end of the slide member 118 as viewed in the drawings. A cylindrical sleeve 122, the external diameter of which is smaller than the internal diameter of the annular collar 120, extends from the collar and forms an annular chamber 124 between the sleeve and the collar. The annular chamber 124 provides two functions. One function is to receive and anchor the right end of the spring 114 as seen in FIGS. 2, 4, 6 and 8. The other function is to act as a flow chamber through, into or past the annular collar 120 depending upon the mode of operation to which the valve assembly 14 has been set. For the latter flow purposes, the annular chamber 124 is open to the rear by arcuate slots 126, as seen in FIGS. 5B, 7B and 9B. Thus, fluid is capable of flow through the arcuate slots 126 to an annular water zone 128 on the external surface of the slide member 118 and to the right of the annular collar 120 as viewed in the drawing. The annular water zone 128 is defined on the left as viewed in the drawings by the arcuate slots 126 and on the right by a pair of O-rings 129 and 130 which define a blocking zone 131 between the O-rings.

Figure 5:
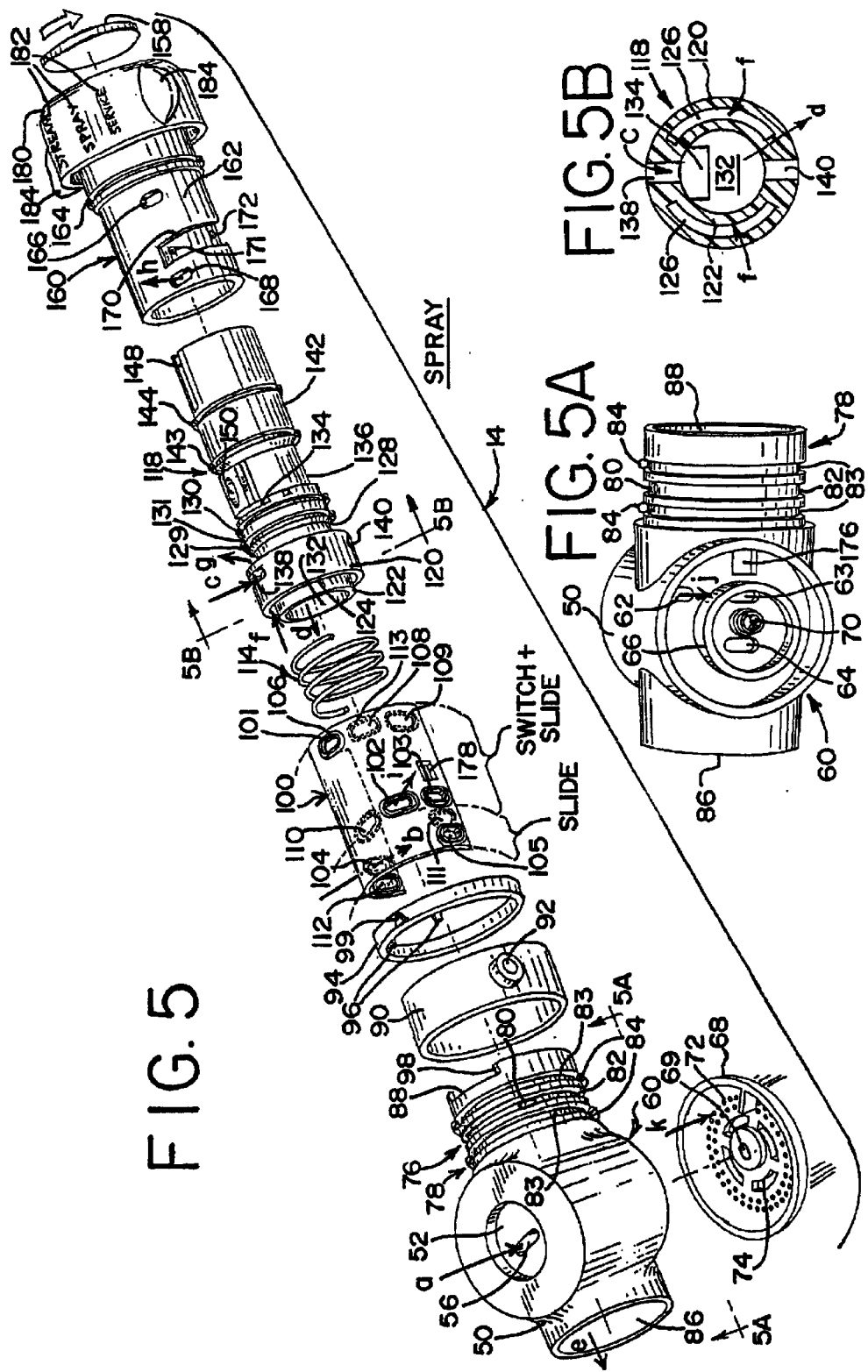
FIG. 5 is an exploded, perspective view of the valve of the unit shown in FIG. 4, but in the spray mode.
Figure 7:
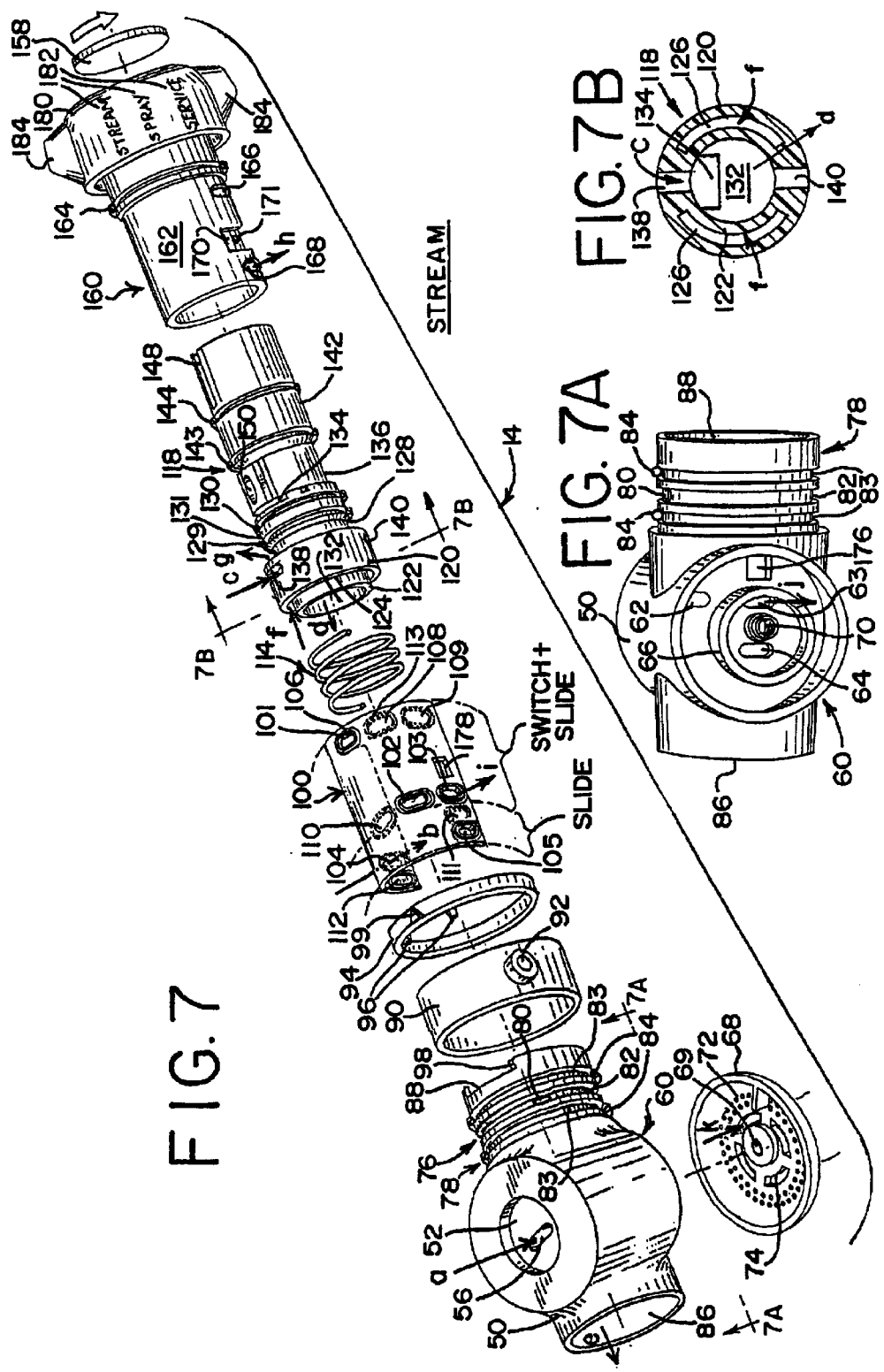
FIG. 7 is an exploded, perspective view of the valve of the unit shown in FIG. 6 in the stream mode.

Returning to the construction of the left end of the slide member 118 as viewed in the drawings, a chamber 132 is also defined in the slide member 118 inside the cylindrical sleeve 122, as best seen in FIGS. 5B, 7B and 9B. The chamber 132 extends from the left end of the slide member 118 into the slide member beyond the O-rings 129 and 130 and blocking zone 131 at which point the rear of the chamber 132 is open by a notched opening 134 to a water zone 136 on the exterior of the slide member. Ports 138 and 140 also open through the annular collar 120 to the annular chamber 124, as best seen in FIGS. 3, 5, 5B, 7, 7B, 9 and 9B.

As previously mentioned, the notched opening 134 opens to the water zone 136 on the slide member 118. The water zone 136 is defined by the blocking zone 131 and its O-rings 129 and 130 to the left as viewed in the drawing, and by a blocking zone 142 and its O-rings 143 and 144 to the right of the water zone 136 as viewed in the drawing.

The remainder of the right end of the slide member 118, as viewed in FIGS. 2, 4, 6 and 8, defines a chamber 146 with an elongate slot 148 which opens to the chamber 146. An opening 150 in the water zone 136 includes a diaphragm 152 responsive to the pressure in the water zone 136 to actuate a sensor 154 in the chamber 146. The chamber 146 itself does not contain fluid during any of the operating modes, but merely provides a housing for sensors.

When the valve is either in the service, spray or stream modes, i.e. whenever water is passing through either the particulate metal medium 36 alone or also through the carbon block filter 38, the diaphragm 152 will be depressed to actuate the sensor 154 and thereby measure the flow volume that has passed through the water treatment housing 16 to indicate via an indicator light (not shown) through the end of the slide member 118 that it is time to replace the metal particulate medium 36 and the carbon block filter 38.

The chamber 146 also contains a second mechanical sensor 156 which rides in the slot 148 and which is actuated, as shown in FIG. 2, when the valve is in the service mode by a cam surface 157. The cam surface 157 only contacts the mechanical sensor 156 when the rotatable switch 160 is in the service mode. Otherwise the cam surface 157 retracts from the sensor 156 in the spray and stream modes. The service life of the metal particulate medium 36 may typically be 2000 hr. whereas the service life of the carbon block filter may typically be 200 hr. Accordingly, this combination of sensors 154 and 156 will indicate when the medium which is the earliest to be exhausted requires replacement of the media. In addition, batteries or the like 159 may be included in the chamber 146 as needed to power the sensors or any indicator lights that may be present.

To complete the slide member 118, the right end of the chamber 146 is capped with a disc 158 to provide a push button surface for slidably moving the slide member. The disc 158 may be light transmitting, for example, where an indicator light (not shown) is included to show the length of time of operation and indicate that treatment media replacement is needed.

The last principal component of the valve assembly 14 is a rotatable switch member 160. The rotatable switch member 160 comprises a generally cylindrical elongate tube 162 which is positioned to extend over the slide member 118 until its left end, as viewed in FIGS. 2, 4, 6 and 8, abuts the right end of the annular collar 120. The exterior surface of the elongate tube 162 is positioned within the stationary gasket 100 and through the area labeled as "switch and slide" in FIGS. 2, 4, 6 and 8, and the elongate tube is rotatable relative to that gasket. An O-ring 164 encircles the elongate tube 162 and seals the tube against flow of fluid to the right of the O-ring 164 as viewed in the drawings. The elongate tube 162 also includes a pair of ports 166 and 168 spaced along the length of the tube as best viewed in FIGS. 3, 5, 7 and 9.

The elongate tube 162 also includes an arcuate recess 170 on its exterior surface having three indents, 171, 172 and 173 spaced along its length. A spring loaded detent 174 is positioned through an opening 176 in the valve housing 50, as best seen in FIGS. 5A, 7A and 9A, an opening 178 in the stationary gasket 100, as best seen in FIGS. 3, 5, 7 and 9, and into the arcuate recess 170. Depending upon the position of rotation of the rotatable switch 160 between the service, spray or stream positions, the detent 174 will enter one of the indents 171, 172 or 173 to restrain the rotatable switch against rotation when the switch is in one of the operating positions and to indicate when the switch has been positioned in one of its positions.

The rotatable switch 160 also includes an enlarged head 180 at its right end as viewed in the drawings. The enlarged head 180 preferably has an external diameter which is approximately the same as the external diameter of the indicator ring 94 and the service control ring 90 as seen in FIGS. 2, 4, 6 and 8. The external surface of the head 180 preferably includes indicia 182 as to the mode of operation, i.e. "stream", "spray" or "service". The indicia 182 are adapted to align with the fixed pointer 99 on the stationary indicator ring to exhibit the mode of operation of the valve as the rotatable switch 160 is rotated between its several operating positions. To facilitate such rotation, a pair of wings 184 are also preferably molded onto the head 180.

With particular reference to FIGS. 3, 5, 7 and 9 and the stationary gasket 100, it will be seen that a portion of the stationary gasket 100 overlies both the rotatable switch and the slide member, and the remainder of the gasket 100 overlies only the slide member when the valve has been fully assembled.

As previously discussed, the interface between the treatment housing 16 and the valve housing 50 is the projection 18, as viewed in FIGS. 2, 4, 6 and 8, which functions to at least in part couple the valve housing 50 to the treatment housing 16, and also to provide passages for the fluid to flow to and from the valve housing and water treatment media in the treatment housing. As previously mentioned, the projection 18 is preferably formed as an integral part of the treatment housing 16, such as by molding. The projection 18 includes a pair of passages 186 and 188 within its confines. A passage 190 is also defined between the outer surface of the projection 18 and the inner surface of the valve housing 50 as best seen in FIGS. 2, 4, 6 and 8. The left end of passage 186 communicates with the channel 42 between the lower section 22 of the treatment unit and the carbon block filter 38, and the right end of passage 186 communicates to chamber 132 in the slide member 118. The passage 188 communicates by way of an opening 192 to the fine filter 34 and bottom side of the lower water treating section 22. Water passes to the opening 192 from an annular passage 194 between the outer surface of the projection 18 and the inner surface of the valve housing 50, and defined between the O-rings 196. Finally, the passage 190 about the exterior of the projection 18 communicates between the channel 44 between the treatment housing 16 and the carbon block filter 38 to either the openings 62 or 63 in the bottom directed discharge 60, depending upon whether the valve is set for the spray or stream modes.

A description of the operation of the water treatment unit of the preferred embodiments of the present invention follows for each of its service, spray, stream and backflush modes.

The Service Mode

Figure 3:
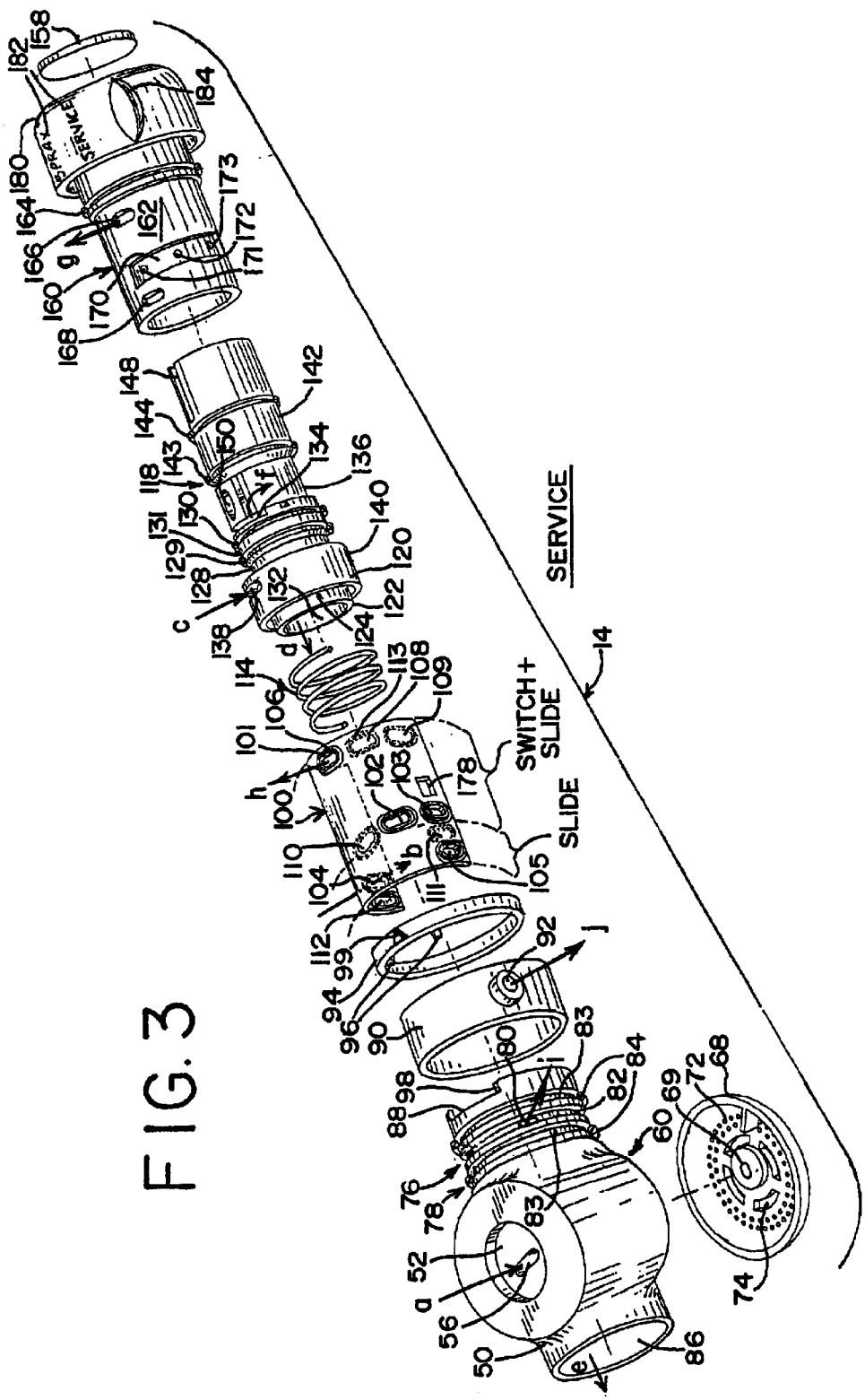
FIG. 3 is a exploded, perspective view of the valve of the unit shown in FIG. 2 in the service mode.

With particular reference to FIGS. 1, 2 and 3, in order to initiate operation in the service mode, the head 180 of the rotatable switch 160 is rotated as shown in FIG. 1 so that the "service" indicia 182 is aligned with the position indicator ring 94 and its pointer 99. In this mode, as well as in the spray and stream modes, the slide member 118 will be biased to the right as viewed in the drawings by spring 114 so that the disc 158 is positioned at its furthest right, and preferably flush with the end of the head 180 of the rotatable switch 160. Also when the rotatable switch 160 has been rotated to the service mode, the spring loaded detent 174 will snap into the indent 173 to indicate when the rotatable switch is correctly positioned and to hold it in the service mode.

When the rotatable switch 160 has been positioned in the service mode, fluid from the faucet F will pass through the adapter 54 and inlet opening 56 on the valve housing 50 as indicated by the arrow a in FIG. 3. From there the fluid will pass through the port 104 on the stationary gasket 100 as indicated by the arrow b, the port 138 on the annular collar 120 of the slide member 118 as indicated by the arrow c, from the chamber 132 in the slide member 118, as indicated by the arrow d, through the annular passage 194 between O-rings 196 and through the opening 192 in the projection 18, and through the passage 188 of the projection 18 as viewed in FIG. 2 and as indicated by the arrow e, and into the bottom of the treatment housing 16 as viewed in FIG. 2.

Once in the treatment housing, the fluid will flow upwardly through the fine filter 34 where larger particulate contaminants will be captured. The fluid will then lift and agitate the metal particulate treatment medium 36 from the lower section 22 through the opening 28 into the upper section 24. This initial medium flow will flush and regenerate the metal particulate treatment medium 36 as described in my U.S. Pat. No. 6,042,729. After the water has been treated by and passes the particulate treatment medium 36, it will pass through the fine mesh filter 35 and then flow between the vanes 32 at the top of the treatment housing 16 down through the channel between the housing and the upper section 24 and into the channel 44. The water will then pass through the carbon block filter 38, through the channel 42 and between the vertical ribs 40 and out through the passage 186 in the projection 18.

From the passage 186, the liquid flows out of the right end of the projection 18 as viewed in FIG. 2 and into chamber 132 and then out through notch 134 into the water zone 136 of the slide member 118 as indicated by the arrow f in FIG. 3. When the fluid is in the water zone 136, it will exert pressure on the diaphragm 152 in opening 150 to actuate the sensor 154 which counts the amount of time and/or volume of flow in which the treatment assembly has been operated in the service mode. The fluid in water zone 136 will then flow from port 166 in the rotatable switch 160 as indicated by the arrow g in FIG. 3, and then through the port 101 in the stationary gasket 100, as indicated by the arrow h. From the port 101 in the stationary gasket 100, the fluid will then flow from the opening 80 in the cylindrical portion 78 of the valve housing 50, and into the annular passage 82 from where it will be discharged from port 92 in the service control ring 90. As previously mentioned, the service control ring 90 may be rotated preferably 360° to any one of a wide number of positions so that the service fluid may be directed in any one of a number of desired directions, including upwardly in the fashion of a water fountain, or downwardly to fill a container beneath the treatment assembly 12.

When the rotatable switch 160 is in the service mode, the blind seal 110 on the stationary gasket 100 will block port 168 on the rotatable switch 160, and the blind seal 111 on the stationary gasket 100 will block port 140 on the slide member 118.

Also when the rotatable switch 160 is in the service mode, the cam surface 157 on the rotatable switch will contact the mechanical sensor 156 to energize it. This occurs only during the service mode. When the mechanical sensor 156 is energized, it will measure the time and/or volume flow through the carbon block filter 38 to provide an indication when the life of the carbon block filter has been reached. As will be discussed to follow, flow only occurs through the carbon block filter in the service mode.

The Spray Mode

With particular reference to FIGS. 4, 5, 5A and 5B, in order to initiate operation in the spray mode, the head 180 of the rotatable switch 160 is rotated counterclockwise as viewed from the right in the drawings from the service mode to the spray mode and so that the "spray" indicia 182 will be aligned with the pointer 99 on the position indicator ring 94. Also when the rotatable switch 160 has been rotated to the spray mode, the spring loaded detent 174 will snap into the indent 172 to indicate when the rotatable switch is correctly positioned and to hold it in the spray mode.

When the rotatable switch 160 has been positioned in the spray mode, the fluid will pass from the faucet F, through the adapter 54 and the inlet opening 56 in the valve housing 50 and the port 104 in the stationary gasket 100 as indicated by arrows a and b respectively in FIG. 5.

From the port 104 in the stationary gasket 100, the fluid will flow through the port 138 in the annular collar 120 of the slide valve 118, as indicated by the arrow c in FIGS. 5 and 5B, and into chamber 132 in the slide member 118. The fluid will then flow from the chamber 132, as indicated by the arrow d, through the annular passage 194 between O-rings 196, through the port 192 in the projection 18 and through the passage 188 as shown by the arrow e and to the bottom of the treatment chamber 20. From there, the fluid will again flow upwardly through the fine filter 34 where larger particulate contaminants will be captured. The fluid will then lift the particulate metal treatment medium 36, as previously described with respect to the service mode, into the upper section 24 where it will be treated. From there the fluid will pass through the fine mesh filter 35 and then flow past the vanes 32 downwardly between the upper section 24 and the treatment housing 16, and downwardly through channel 44, but this time bypassing the carbon block filter 38 because the passage 186 in the projection 18 has been blocked in the valve housing 50 by the blind seal 108 which has covered port 166 in the rotatable switch 160. After bypassing the carbon block filter, the fluid flows out of the treatment chamber 20 through passage 190 between the exterior of the projection 18 and the inner wall of the valve housing 50, through the annular chamber 124 of the slide member 118 as indicated by the arrow f, and out through the arcuate slots 126 at the back of the chamber 124, and into the annular water zone 128 as indicated by the arrow g. From there the fluid flows from the annular water zone 128 through the port 168 on the rotatable switch 160, as indicated by the arrow h, through the port 102 on the stationary gasket 100 as indicated by the arrow i, and through the opening 62 on the bottom directed discharge 60, as indicated by the arrow j in FIG. 5A. Due to the partition wall 66 in the bottom directed discharge 60, fluid flow from opening 62 will be restricted to the outer portion of the bottom directed discharge 60 so as to flow through the small hole pattern 72 in the cap 68 to be discharged from the unit as a spray as shown in FIG. 5.

When the rotatable switch 160 is in the spray mode, as previously mentioned the blind seal 108 on the stationary gasket 100 will block port 166 on the rotatable switch 160, and the blind seal 111 also on the stationary gasket 100 will block port 140 on the slide member 118.

Although flow does not take place through the water zone 136 on the slide member 118 in the spray mode, the water zone 136 is filled with water at the pressure of the system up to port 166 which is blocked by the blind seal 108. Accordingly, the diaphragm 152 in the opening 150 will actuate the sensor 154 to measure the amount of usage of the particulate treatment medium 36 which is in use during the spray mode. However, the cam surface 157 will be rotated out of contact with the mechanical sensor 156 to deactivate that sensor which only functions during the service mode to measure the amount of usage of the carbon block filter 38. The latter filter is bypassed and not used during the spray mode.

The Stream Mode

With particular reference to FIGS. 6, 7, 7A and 7B, in order to initiate the stream mode, the head 180 of the rotatable switch 160 is rotated one further position in the counterclockwise direction as viewed from the right in the drawings from the spray mode to the stream mode so that the "stream" indicia 182 will be aligned with the pointer 99 on the position indicator ring 94. Also when the rotatable switch 160 has been rotated to the stream mode, the spring loaded detent 174 will snap into the indent 171 to indicate when the rotatable switch is correctly positioned and to hold it in the stream mode.

When the rotatable switch 160 has been positioned in the stream mode, the fluid from the faucet F will now pass the adapter 54 and enter the inlet opening 56 in the valve housing 50 as shown by the arrow a. From the inlet opening 56, the fluid will pass through the port 104 on the stationary gasket 100 as indicated by the arrow b, and will enter the port 138 on the annular collar 120 of the slide member 118 as indicated by the arrow c. From the port 138 the fluid will enter the chamber 132 of the slide member 118 and will pass from that chamber as indicated by the arrow d through the annular passage 194 between O-rings 196, through the opening 192 and through the passage 188 of the projection 18, and into the bottom of the treatment housing 16 as indicated by the arrow e.

Again, the fluid will flow upwardly through the fine filter 34 and will lift the particulate treatment medium 36, as previously described with respect to the service mode, from the lower section 22 to the upper section 24 through the opening 28, where the fluid will be treated by the particulate treatment medium 36 in the upper section 24. From there the fluid will pass through the fine mesh filter 35 and then flow past the vanes 32, flow downwardly between the upper section 24 and the treatment housing 16, and through channel 44 again in bypassing relationship to the carbon block filter 38 because the passage 186 in the projection 18 has been blocked in the valve housing 50 by the blind seal 109 which has covered port 166 in the rotatable switch 160.

From the housing 16, the fluid will flow through the passage 190 between the exterior of the projection 18 and the interior of the valve housing 50 and its chamber 58. The fluid will continue into the annular chamber 124 as indicated by the arrow f in the slide member 118, and through the arcuate slots 126 at the rear of that chamber into the annular water zone 128 as indicated by the arrow g.

Again, the fluid will flow from the annular water zone 128 through the port 168 as shown by the arrow h. Thus far, the fluid flow in the stream mode is substantially identical to the flow in the previously described spray mode. However, instead of the fluid flowing from port 168 through the port 102 in the stationary gasket 100 as it did in the spray mode, the fluid will now flow through port 103 in the stationary gasket as indicated by the arrow i due to the further indexed rotation of the rotatable switch 160. The fluid will then flow through the port 63 in the bottom directed discharge 60 to the interior of the partition wall 66 as indicated by the arrow j to then pass through the slot pattern 74 on the cap 68, as indicated by the arrow k, to issue from the valve housing 50 as a stream due to the slotted construction of the slot pattern 74.

When the rotatable switch 160 is in the stream mode, as previously mentioned the blind seal 109 on the stationary gasket 100 will block port 166 on the rotatable switch 160, and the blind seal 111 on the stationary gasket 100 will block port 140 on the slide member 118.

Again, as in the spray mode, although flow does not take place through the water zone 136 on the slide member 118 in the stream mode, the water zone 136 is filled with water at the pressure of the system up to the port 166 which is blocked by the blind seal 109. Accordingly, the diaphragm 152 in the opening 150 will actuate the sensor 154 to measure the amount of usage of the particulate treatment medium 36 which is in use during the stream mode. However, the cam surface 157 will be rotated out of contact with the mechanical sensor 156 to deactivate the sensor, as it was in the spray mode, because that sensor only functions during the service mode to measure the amount of usage of the carbon block filter 38. The latter filter is bypassed and not used during the stream mode.

The Backflush Mode

With particular reference to FIGS. 8, 9, 9A and 9B, backflush is simply initiated by digitally pushing disc 158 into the head 180 of the rotatable switch 160, as shown by the arrow in FIG. 8, to move the slide valve 118 to the left against the force of spring 114. The slide valve 118 is then manually held in this position for the amount of time desired to complete the backflush operation. This will typically be when the dirty backflush which discharges from the valve housing 50 becomes clear.

When the slide valve 118 is moved to the left as shown in the drawings against the force of spring 114, fluid will enter from the faucet F through the adapter 54 and will pass into the inlet 56 on the valve housing 50 as shown by the arrow a. From the inlet 56, the fluid will again pass through the port 104 on the stationary gasket 100 as shown by the arrow b. However, because the slide valve 118 has now been displaced to the left, the port 138 has also been displaced to the left and the annular water zone 128 is now aligned with the port 104 on the stationary gasket 100. Accordingly, the fluid will pass from the port 104 on the stationary gasket 100 to the annular water zone 128 as shown by the arrow c, and from there will reversely flow through the arcuate slots 126 and into the chamber 124 from where it will pass longitudinally, as shown by the arrow d, through the passage 190 between the exterior of the projection 18 and the inner wall of the valve housing 50 and its chamber 58 as seen in FIG. 8.

From the passage 190, the fluid will flow into the treatment housing 16 as indicated by the arrow e and upwardly through the channel 44 around the carbon block filter 38, past the channel between the upper section 24 and inner wall of the treatment chamber 20, through the vanes 32, and downwardly through the fine mesh filter 35, the upper section 24 and lower section 22 of the treatment chamber 20. This flow pattern will cause all of the particulate treatment medium 36 to reside in the lower section 22, as shown in FIG. 8, and will reversely flush the impurities that have collected on the particulate treatment medium 36 from the medium and down through the fine filter 34 while at the same time removing any containments which may have previously collected on the fine filter 34.

The fluid will then flow from the bottom of the treatment housing 16 in the direction of arrow f into passage 188 in the projection 18 and out through its opening 192, and into the chamber 132 in the slide valve 118 as shown by the arrow g. From the chamber 132 in the slide member 118, the fluid will pass through the port 140 as shown by the arrow h, the port 105 in the stationary gasket 100 as shown by the arrow i and the opening 64 in the bottom directed discharge 60 and within the partition wall 66 as shown by the arrow j. From there, the dirty fluid is discharged from the bottom directed discharge 60 through the slot pattern 74 as shown by the arrow k.

When it is desired to discontinue backflushing, all that need be done is to relieve the force on the disc 158. This will permit the spring 114 to return the slide member 118 to the right as viewed in the drawing and to its unretracted position as shown in FIG. 2, 4 or 6. When the slide member 118 has been returned to its unretracted position, the valve assembly 14 will resume whatever mode its rotatable switch 160 was previously set to, i.e. the service, spray or stream mode. In this regard, the setting of the rotatable switch 160 in any one of its three aforementioned modes is not relevant during the backflush mode and plays no role in backflush. The rotatable switch 160 may be in any mode setting during backflush.

When the slide member 118 has been displaced to the left in the backflush mode, the blind seal 112 on the stationary gasket 100 will block the port 138 on the slide member, port 166 will be blocked by the blocking zone 142 and port 168 will be blocked by the blocking zone 131.

From the foregoing it will be appreciated that a water treatment unit in accordance with the present invention contains one or more water treatment media and an operating valve permits the selection of several operating modes, and yet the unit is sufficiently compact to permit it to be mounted directly on the faucet or tap of the user's sink. The treatment unit of the present invention is capable of operation between a service, spray and stream mode. In the service mode the water is treated by at least one if not all of the various water treatment media contained in the unit housing after which the water is discharged from the valve of the unit for service use. Moreover, the service discharge may be adjusted to direct the treated water as desired by the user, for example, upwardly to permit drinking the water as one would drink the water from a water fountain or downwardly into a container or the like beneath the faucet. The stream and spray modes are useful, for example, for the rinsing of dishes or the washing of fruits and vegetables and, in these latter modes, the water will pass through at least one of the water treatment media in the unit housing. Also in the present invention, the valve of the treatment unit may be operated in a backflush mode in which water may be directed in the reverse direction through at least one of the water treatment media to regenerate that media. The volume of flow through the unit may also be sensed to measure the life of the treatment media to signal when they should be replaced.

It will be understood that the preferred embodiment of the present invention which has been described is merely illustrative of the principles of the present invention. Numerous modifications may be made by those skilled in the art without departing from the true spirit and scope of the invention.

I claim:

1. A valve comprising:

a valve housing having an elongate chamber therein, an inlet for fluid on said valve housing communicating with said chamber, and first and second discharges on said valve housing communicating with said chamber, said first discharge including first and second openings for discharging the fluid from said valve housing;

a stationary member in said chamber having a plurality of openings therethrough at least some of which align with said inlet for fluid and said first and second openings of said first discharge and said second discharge, said stationary member generally conforming in shape and size to the shape and size of said chamber; and a switch member in said stationary member, said switch member being rotatable between spray, stream and service positions respectively to direct the fluid to said first opening so that it is discharged from said first discharge in the form of a spray when in said spray position, to direct the fluid to said second opening so that it is discharged from said first discharge as a stream when in said stream position, and to direct the fluid to said second discharge on said valve housing to discharge the fluid as service fluid from the valve housing when in said service position.

2. The valve of claim 1, wherein said stationary member comprises a gasket.

3. The valve of claim 1, wherein said stationary member includes at least one seal thereon which blocks communication between said inlet and selected ones of said first and second openings and/or discharges when said switch member is rotated between said positions.

4. The valve of claim 1, wherein said chamber, said stationary member and said switch member are generally cylindrical in cross-section.

5. The valve of claim 1, wherein said first discharge on said valve housing includes a cap overlying said first and second openings, said cap comprising a plurality of small openings and at least one large opening spaced from said small openings, and wherein said first opening of said first discharge is aligned with said plurality of small openings to discharge the fluid from said plurality of small openings of said cap as a spray when said switch member is in said spray position, and said second opening of said first discharge is aligned with said large opening of said cap to discharge the fluid from said large opening as a stream when said switch member is in said stream position.

6. The valve of claim 1, wherein said valve housing includes a substantially cylindrical portion, and said second discharge on said valve housing is on said substantially cylindrical portion and includes a passage which extends for a substantial distance around said substantially cylindrical portion.

7. The valve of claim 6, including a control ring at said substantially cylindrical portion which covers said passage, said control ring including a port therethrough for discharging said service fluid, and said control ring and port are rotatable about said substantially cylindrical portion to selectively direct the discharge of the service fluid.

8. The valve of claim 1, including an adapter for mounting said inlet for fluid on the valve housing to the discharge of a faucet.

9. The valve of claim 2, wherein said chamber, said stationary member and said switch member are generally cylindrical in cross section; said first discharge on said valve housing includes a cap overlying said first and second openings, said cap comprising a plurality of small openings and at least one large opening spaced from said small openings, and wherein said first opening of said first discharge is aligned with said plurality of small openings to discharge the fluid from said plurality of small openings of said cap as a spray when said switch member is in said spray position, said second opening of said first discharge is aligned with said large opening of said cap to discharge the fluid from said large opening as a stream when said switch member is in said stream position; and wherein said valve housing includes a substantially cylindrical portion and said second discharge on said valve housing is on said substantially cylindrical portion and includes a passage which extends for a substantial distance around said substantially cylindrical portion.

10. The valve of claim 9, including a control ring at said substantially cylindrical portion which covers said passage, said control ring including a port therethrough for discharging said service fluid, and said control ring and port are rotatable about said substantially cylindrical portion to selectively direct the discharge of the service fluid.

11. The valve of claim 9, including an adapter for mounting said inlet for fluid on the valve housing to the discharge of a faucet.

12. The valve of claim 9, wherein said stationary member includes at least one seal thereon which blocks communication between said inlet and selected ones of said first and second openings and/or discharges when said switch member is rotated between said positions.

13. The valve of claim 9, including a slide member in said chamber which is movable longitudinally between a first position in which said switch member is functional in said spray, stream and service positions, and a second position in which said switch member is not functional in the last three mentioned positions.

14. The valve of claim 13, wherein said second position of said slide member is a backflush position in which the fluid is directed from said inlet for fluid on said valve housing to said second opening of said first discharge.

15. The valve of claim 13, wherein said slide member is in said stationary member and said switch member.

16. The valve of claim 1, including a slide member in said chamber which is movable longitudinally between a first position in which said switch member is functional in said spray, stream and service positions, and a second position in which said switch member is not functional in the last three mentioned positions.

17. The valve of claim 16, wherein said second position of said slide member is a backflush position in which the fluid is directed from said inlet for fluid on said valve housing to said second opening of said first discharge.

18. The valve of claim 13, wherein said slide member is in said stationary member and said switch member.

19. A water treatment unit comprising:

a treatment housing containing a water treatment medium therein;

a valve having an elongate chamber, an inlet for water opening to and communicating with said chamber, and first and second discharges on said valve communicating with said chamber, said first discharge including first and second openings for discharging the water from said chamber;

a stationary member in said chamber having a plurality of openings therethrough at least some of which align with said inlet for water and said first and second openings of said first discharge and said second discharge, said stationary member generally conforming in shape and size to the shape and size of said chamber; and a switch member in said stationary member, said switch member being rotatable between spray, stream and service positions respectively to direct the water through said treatment housing and water treatment medium to said first opening so that it is discharged from said first discharge in the form of a spray when in said spray position, to direct the water through said treatment housing and water treatment medium to said second opening so that it is discharged from said first discharge as a stream when in said stream position, and to direct the water through said treatment housing and water treatment medium to a second discharge on said valve to discharge the water as service water from the valve housing when in said service position.

20. The water treatment unit of claim 19, wherein said stationary member comprises a gasket.

21. The water treatment of claim 19, wherein said stationary member includes at least one seal thereon which blocks communication between said inlet and selected ones of said first and second openings and/or discharges when said switch member is rotated between said positions.

22. The water treatment unit of claim 19, wherein said chamber, said stationary member and said switch member are generally cylindrical in cross-section.

23. The water treatment unit of claim 19, wherein said first discharge includes a cap overlying said first and second openings, said cap comprising a plurality of small openings and at least one large opening spaced from said small openings, and wherein said first opening of said first discharge is aligned with said plurality of small openings to discharge the water from said plurality of small openings of said cap as a spray when said switch member is in said spray position, and said second opening of said first discharge is aligned with said large opening of said cap to discharge the water from said large opening as a stream when said switch member is in said stream position.

24. The water treatment unit of claim 19, wherein said valve includes a substantially cylindrical portion and said second discharge on said valve is on said substantially cylindrical portion and includes a passage which extends for a substantial distance around said substantially cylindrical portion.

25. The water treatment unit of claim 24, including a control ring at said substantially cylindrical portion which covers said passage, said control ring including a port therethrough for discharging said service water, and said control ring and port are rotatable about said substantially cylindrical portion to selectively direct the discharge of the service water.

26. The water treatment unit of claim 19, including an adapter for mounting said inlet for water on the valve to the discharge of a faucet.

27. The water treatment unit of claim 20, wherein said chamber, said stationary member and said switch member are generally cylindrical in cross-section; said first discharge on said valve includes a cap overlying said first and second openings, said cap comprising a plurality of small openings and at least one large opening spaced from said small openings, and wherein said first opening of said first discharge is aligned with said plurality of small openings to discharge the water from said plurality of small openings of said cap as a spray when said switch member is in said spray position, said second opening of said first discharge is aligned with said large opening of said cap to discharge the water from said large opening as a stream when said switch member is in said stream position; and wherein the valve includes a substantially cylindrical portion and said second discharge on the valve is on said substantially cylindrical portion and includes a passage which extends for a substantial distance around said substantially cylindrical portion.

28. The water treatment unit of claim 27, including a control ring at said substantially cylindrical portion which covers said passage, said control ring including a port therethrough for discharging said service water, and said control ring and port are rotatable about said substantially cylindrical portion to selectively direct the discharge of the service water.

29. The water treatment unit of claim 27, including an adapter for mounting said inlet for water on the valve to the discharge of a faucet.

30. The water treatment unit of claim 27, including a slide member in said chamber which is movable longitudinally between a first position in which said switch member is functional in said spray, stream and service positions, and a second position in which the water passes in the reverse direction through said treatment housing and water treatment medium to backflush the medium.

31. The water treatment unit of claim 30, wherein when said slide member is in said second position, the water is directed from said inlet for water through said treatment housing and in the reverse direction through said water treatment medium to said second opening of said first discharge and is discharged therefrom as a stream.

32. The water treatment unit of claim 30, wherein said slide member is in said stationary member and said switch member.

33. The water treatment unit of claim 19, including a slide member in said chamber which is movable longitudinally between a first position in which said switch member is functional in said spray, stream and service positions, and a second position in which the water passes in the reverse direction through said treatment housing and water treatment medium to backflush the medium.

34. The water treatment unit of claim 33, wherein when said slide member is in said second position, the water is directed from said inlet for water through said treatment housing and in the reverse direction through said water treatment medium to said second opening of said first discharge.

35. The water treatment unit of claim 30, wherein said slide member is in said stationary member and said switch member.

36. The water treatment unit of claim 19, wherein said treatment housing contains at least two distinct water treatment media, and said water passes through at least one of said media when said switch member is in either of said spray, stream or service positions or said slide member is in either of its first or second positions.

37. The water treatment unit of claim 36, wherein the water passes through both water treatment media when said switch member is in said service position.

38. The water treatment unit of claim 36, wherein the water treatment media is a finely divided metal particulate and/or charcoal.

39. The water treatment unit of claim 19, wherein said treatment housing includes a projection thereon which extends into said chamber of said valve, and wherein said projection includes at least one passage therethrough and/or together with said chamber defines at least one passage therearound, through which the water flows to and/or from said water treatment medium in said treatment housing.

40. The water treatment unit of claim 39, wherein said projection has an end opposite said treatment housing, and said last mentioned end is located in said stationary member and said switch member.

41. The water treatment unit of claim 27, wherein said treatment housing includes a projection thereon which extends into said chamber of said valve, and wherein said projection includes at least one passage therethrough and/or together with said chamber defines at least one passage therearound, through which the water flows to and/or from said water treatment medium in said treatment housing.

42. The water treatment unit of claim 41, wherein said projection has an end opposite said treatment housing, and said last mentioned end is located in said stationary member and said switch member.

43. The water treatment unit of claim 33, wherein said treatment housing includes a projection thereon which extends into said chamber of said valve, and wherein said projection includes at least one passage therethrough and/or together with said chamber defines at least one passage therearound, through which the water flows to and/or from said water treatment medium in said treatment housing.

44. The water treatment unit of claim 43, wherein said projection has an end opposite said treatment housing, and said last mentioned end is located in said stationary member and said switch member.

45. The water treatment unit of claim 19, including at least one sensor for sensing the amount of water flow through said unit.

46. The water treatment unit of claim 45, wherein said sensor is located in said valve housing.

* * * * *